April 19, 1960

D. E. CHURCH 2,933,012

PORTABLE MICROFILM UNIT

Filed June 21, 1957

INVENTOR

Donald E. Church

BY Arthur Vinograd

Leonard F. Stoll ATTORNEYS

April 19, 1960     D. E. CHURCH     2,933,012
PORTABLE MICROFILM UNIT
Filed June 21, 1957                                          4 Sheets-Sheet 2
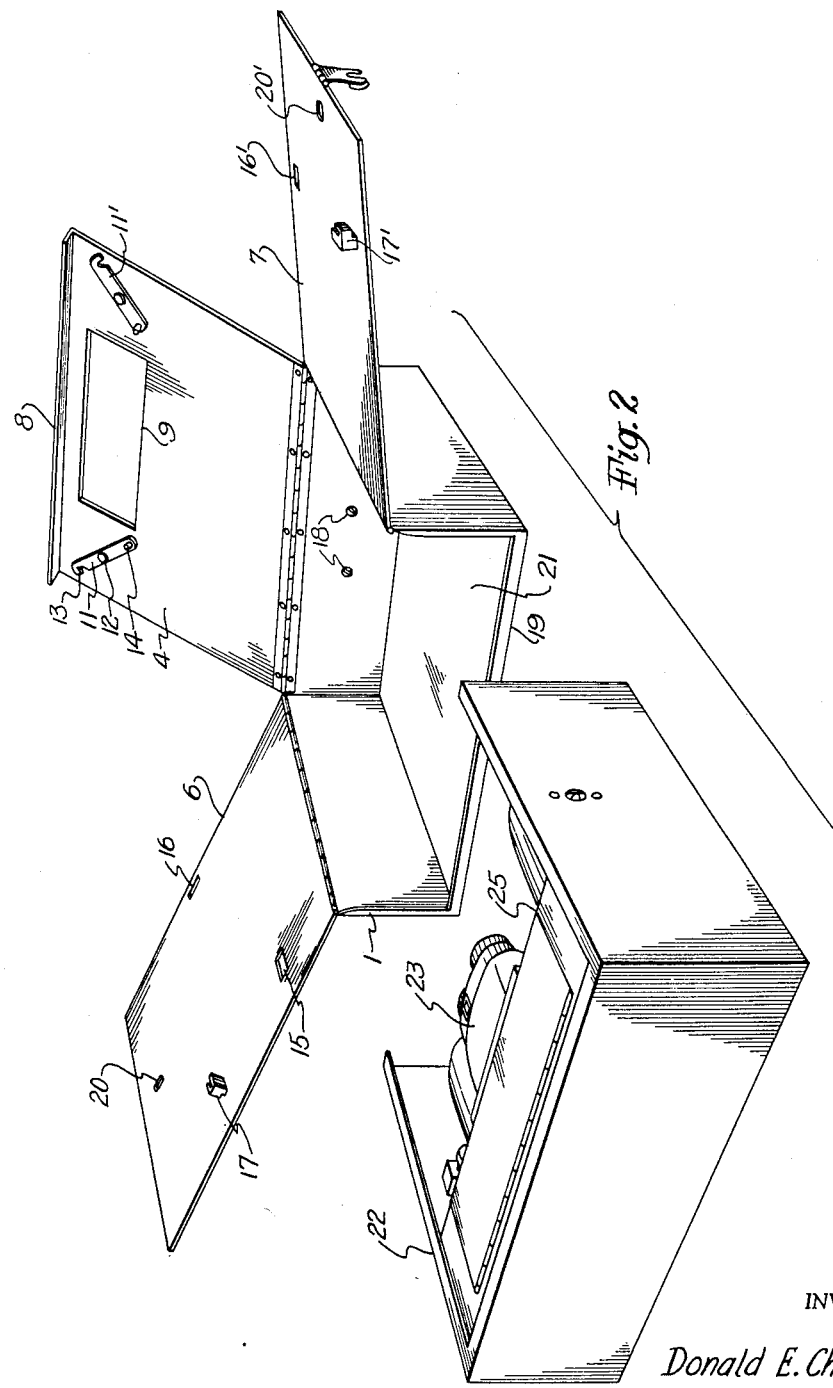
INVENTOR
Donald E. Church
BY *Arthur Vinograd*
*Leonard F. Stoll* ATTORNEYS April 19, 1960

D. E. CHURCH 2,933,012

PORTABLE MICROFILM UNIT

Filed June 21, 1957

INVENTOR
Donald E. Church
BY Arthur Vinograd
Leonard F. Stoll   ATTORNEYS

United States Patent Office 2,933,012
Patented Apr. 19, 1960

2,933,012

PORTABLE MICROFILM UNIT

Donald E. Church, Alexandria, Va.

Application June 21, 1957, Serial No. 667,303

4 Claims. (Cl. 88—24)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952), section 266.

This invention is concerned with a portable microfilm unit and more particularly with a microfilm unit that is extremely light and compact and one that may readily be carried from place-to-place.

The principal microfilm apparatus of the prior art is that which may be referred to as the "flat-bed" type. This type of equipment is suitable for use in a single location but is unsuited for survey microfilming purposes because it ordinarily consists of a heavy fixture which may not readily be moved from its permanent location.

At least one lightweight highly portable microfilm unit is commercially available but it can be used satisfactorily only if the material to be microfilmed consists of single sheets no wider than 11 inches. Under survey conditions these requirements represent the exception rather than the rule since most surveys involve the collection of data from records possessed by a considerable number of respondents. Customarily the microfilm unit is moved frequently, often carried on foot from one respondent to another with the number of exposures at any one location in the relatively small range of from three or four to seldom over two hundred. Such records are frequently kept in bound volumes or have other papers attached. Either situation precludes the use of the commercially available unit referred to above. Also the need occasionally arises for microfilming a few selected records or maps that are larger than 11 inches in width. This likewise cannot be done with the apparatus of the prior art.

The present invention overcomes the disadvantages of the known portable microfilm units in that it provides a very flexible, lightweight unit having particular utility for use in census type surveys in which a large number of respondents are contacted. The unit of the present invention may be carried in the form of a small completely enclosed case which is also suitable for transport through the mails or by parcel post. The small case opens up into a rigid box-like structure enclosing a camera unit for microfilming records smaller than 11 inches in width. The unit of the present invention also incorporates the feature of a removable bottom plate which may be utilized when it is desired to microfilm records wider than 11 inches or when the particular record desired is contained in a book or bound volume which is not suitable for placement within the box structure. In such a case the bottom plate is removed and the material is photographed through the opening presented thereby. Overlapping exposures may thus be obtained and combined in a manner similar to the well-known procedure commonly employed in aerial photography.

It is therefore an object of this invention to provide a microfilm unit suitable for use under all types of operating conditions encountered in field surveys.

Another object of the present invention is to provide a lightweight portable microfilm unit suitable for microfilming all types of record material.

Another object is to provide a rigid box-like microfilm structure of the knock-down type, which collapses into a lightweight compact portable case.

Another object is to provide a microfilm unit which may be quickly and easily set up and which requires no extensive adjustments.

Still another object of the present invention is to provide a fixed-distance portable microfilm unit which may be folded into a compact case and carried by hand or transported through the mails.

Other uses and advantages of the invention will become apparent upon reference to the specification and drawings, in which:

Fig. 2 shows an exploded view of the unit of Fig. 1 in the opened position with the internal camera unit removed;

Figure 1:
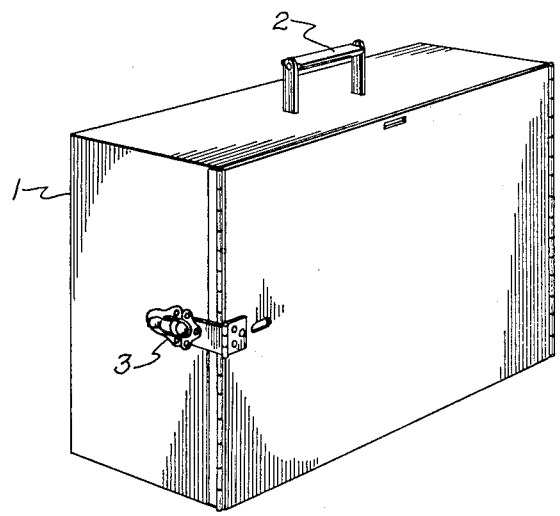
Fig. 1 shows the microfilm unit of the present invention folded into a small, compact, lightweight case.

Referring to the drawings, in Fig. 1 is shown at 1 the microfilm unit of the present invention completely encased, ready for transport. Case 1 may consist of any rigid lightweight material, such as aluminum, plywood, or fiberboard. Incorporated in case 1 is a handle 2 which may be used for carrying the case. Latch 3 serves to securely fasten the case into a completely enclosed unit.

Fig. 2 shows case 1 opened with the camera unit 22 removed. As shown, case unit 1 includes pivoted back wall 4 and side walls 6 and 7. Back wall 4 includes a flanged portion 8 and an aperture 9. The function of flange 8 will be more completely explained later in the application. Aperture 9 serves as an outlet for electrical connection to the camera unit 22. Also shown on back wall 4 are two similar rotatable members 11 and 11' pivoted about a central rivet portion 12. Member 11 at one end includes a recessed hooklike portion 13 and at the other end includes a dowel member 14. The hooklike portion 13 of member 11 is adapted to be rotated and inserted in the slot 16 of wall 6 so as to engage the lower edge of such slot to maintain walls 4 and 6 in edgewise engagement. Member 11' serves a similar function with respect to wall 7. When member 11 is in a vertical position and the case is closed as shown in Fig. 1, dowel 14 serves to engage a lower portion 25 of camera unit 22 and to maintain bottom portion 25 in contact with flange 19 of unit 1. Wall 6 includes an elongated aperture 20, a rectangular aperture 16, and a projecting support member 17, the functions of which will be more fully explained subsequently. Unit 1 as shown in Fig. 2 includes screws 18 for affixing handle 2 (Fig. 1) to the unit. Also shown is a removable bottom plate 21. The camera unit 22 including a camera 23 is inserted into the case 1 downwardly as viewed in Fig. 2 so that the bottom of lower portion 25 is contained by flange 19 and flange 8 when case 1 is closed.

Figure 3A:
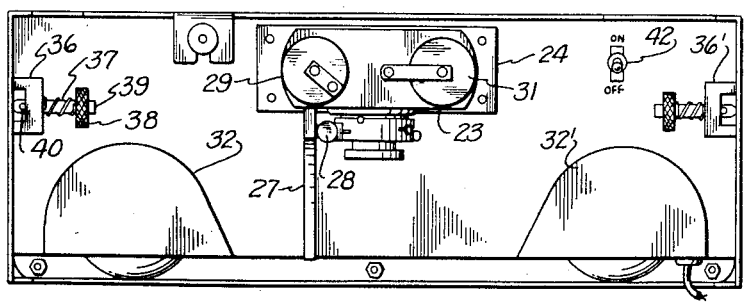
Fig. 3A is a top view of the camera unit of Fig. 2.
Figure 3B:
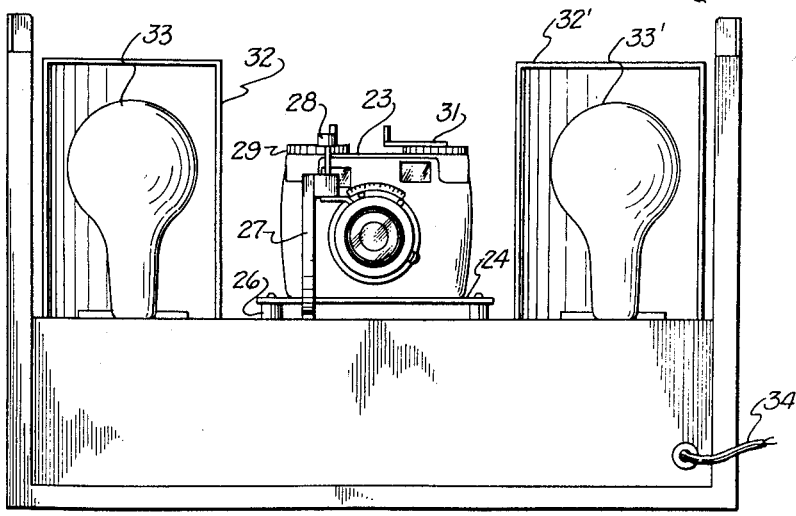
Fig. 3B is a front view of the camera unit of Fig. 2.

In Figs. 3A and 3B are shown top and front views respectively of the camera unit 22 of Fig. 2. Included in camera unit 22 are shield members 32 and 32' enclosing conventional light bulbs 33 and 33' for illuminating the material to be photographed. Electrical current is supplied to bulbs 33 and 33' by way of a cord 34. A flat plate 24 affixed to the unit 22 by means of four post members 26 serves as a support for a camera 23. Camera 23 may be secured to flat plate 24 by any suitable means. A support member 27 serves to maintain a plunger member 28 in contact with the actuating member of camera 23 so that the picture may be taken by a simple longitudinal movement of plunger 28. Rotating members 29 and 31 are the wind and rewind units, respectively, of camera 23. The particular features of camera 23 and the related elements are considered conventional and are not relied on for patentability. An on-off switch 42 serves to make electrical contact with the light bulbs 33 and 33'.

Fastening units 36 and 36' in the form of U-shaped members serve to affix the camera unit 22 to walls 6 and 7 of Fig. 2. U-shaped members 36 and 36' include a slidable rod 39 having an annular head portion 38. Disposed between head portion 38 and the face of U-shaped member 36 is a compressible spring 37. A smaller transverse rod 40 passes through the end portion of sliding rod member 39. Rod 40 in conjunction with the side walls of apertures 20 and 20' of Fig. 2 hold the unit 22 in rigid engagement with walls 6 and 7.

Figure 4:
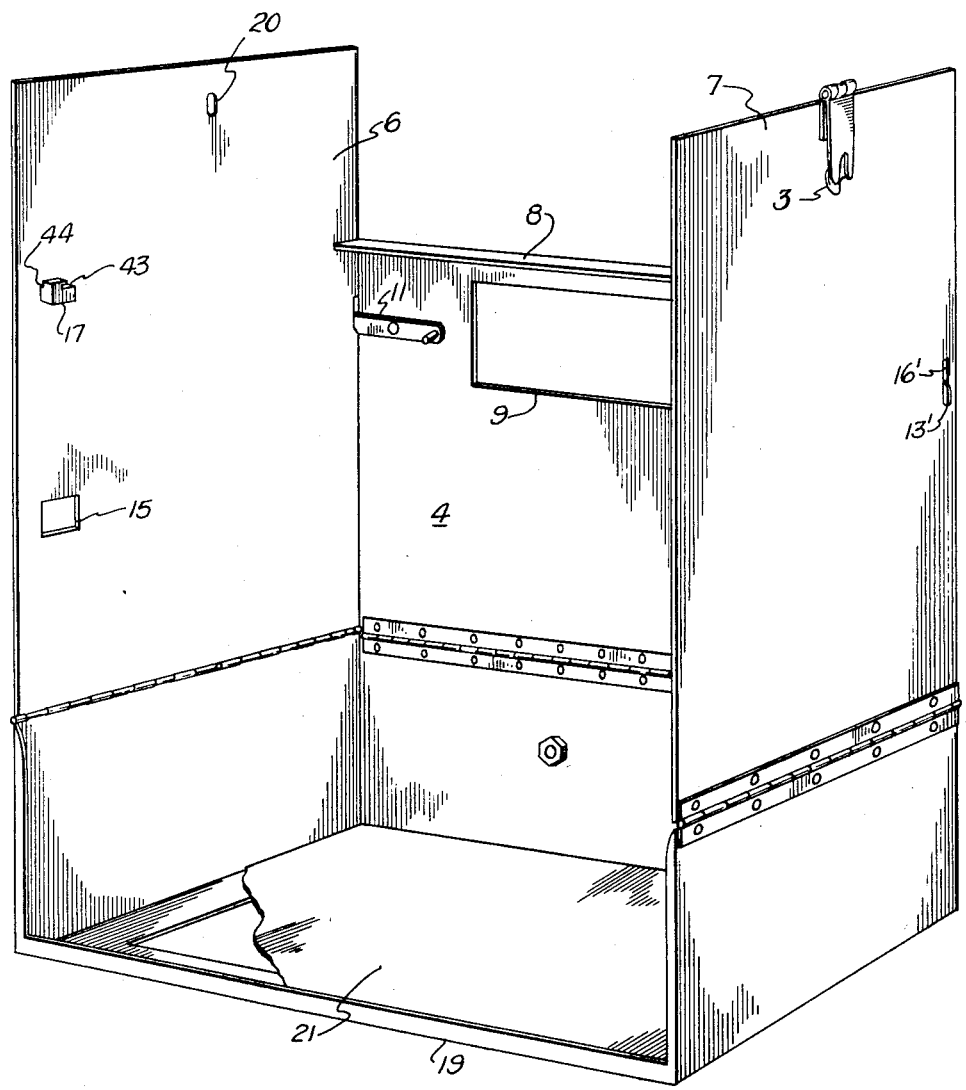
Fig. 4 shows the assembled box-like structure of the present invention with the camera unit omitted.

Fig. 4 shows the unit 1 assembled with the camera unit 22 omitted and the removable bottom plate 21 broken away. As can be seen, member 11 is rotated into the horizontal position and the hook-like portion 13' of member 11' engages the lower edge of aperture 16' in the wall 7. Wall 6 is similarly engaged. Ledge 8 is in a position to serve as a support for the camera unit 22 when it is placed in operating position. Support unit 17 includes an internal channel 44 and an undercut portion 43. The channel and undercut portion both serve to engage the edges of camera unit 22. Rectangular aperture 15 only serves as a clearance for a similar support member 17' on wall 7 when the unit is in the closed position shown in Fig. 1.

Figure 5:
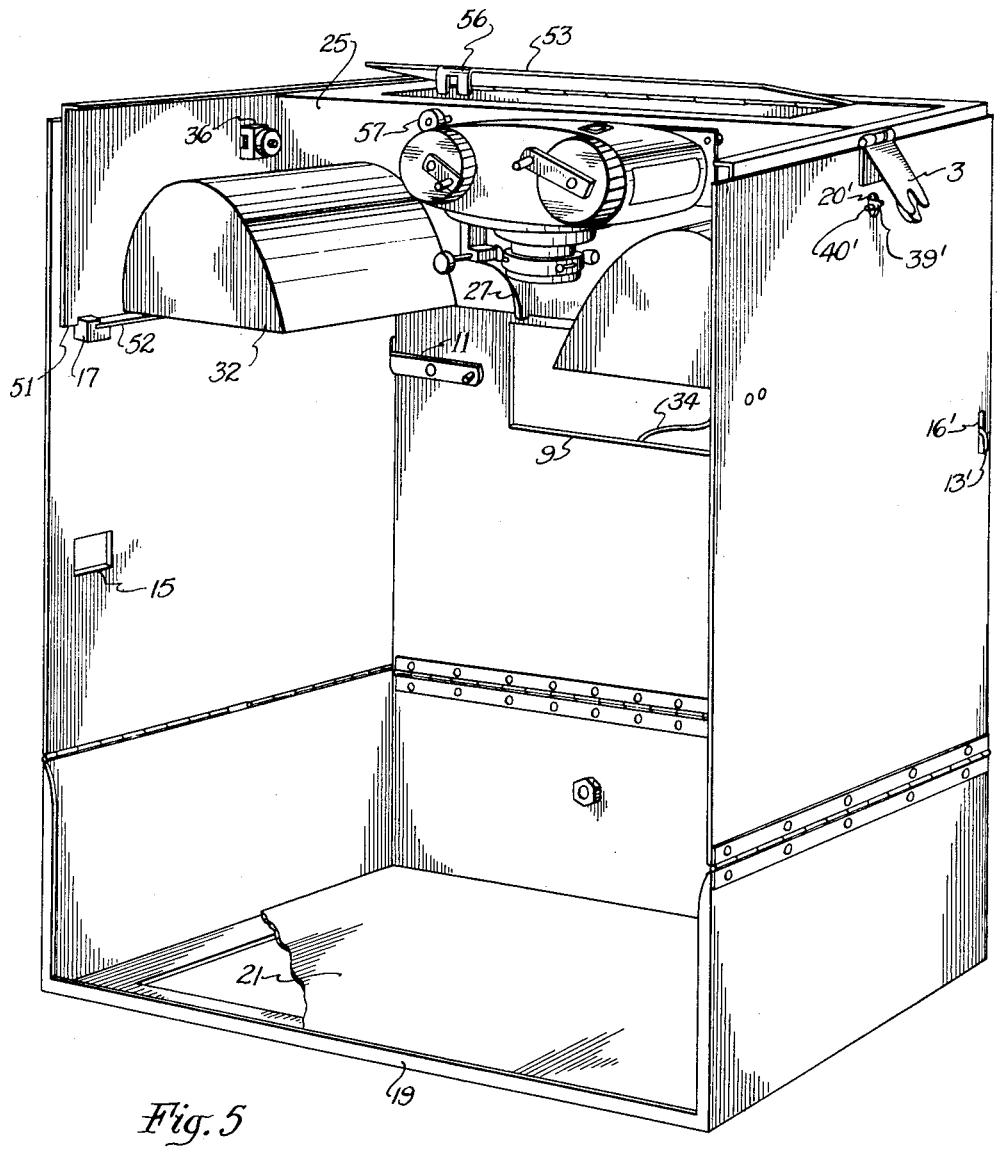
Fig. 5 shows the complete assembly with the camera unit in its operative position.

Fig. 5 shows the complete assembly in readiness for the photographing of material to be recorded. As can be seen, the camera unit 22 is supported by the side walls 6 and 7 at four points in addition to the support provided by ledge 8 of wall 4, as shown in Fig. 4. The four supporting elements for unit 22 are the two U-shaped elements 36 and 36' and the recessed channel support elements 17 and 17'. U-shaped element 36 including the rod portion 39 is adapted to be longitudinally moved through aperture 20 and rotated so that the smaller rod portion 40 is positioned across the narrower dimension of aperture 20. Spring 37, shown in Fig. 3A, acting against head member 38 and the face of U-shaped member 36 in compression serves to maintain the unit 22 against side wall 6. Element 36' serves a similar function for wall 7. As can be seen, edge 51 and flange 52 of unit 22 are so constructed as to fit within the channel 44 and the undercut portion 43, respectively, of support member 17. In this way the unit 22 is rigidly affixed to and supported by the three walls 4, 6, and 7.

A pivoted cover member 53 encloses a recess in the lower portion 25 of camera unit 22 which may be used for storing extra film or related accessories. Cover member 53 includes a U-shaped projection 56 which is adapted to be securely clamped to portion 25 by means of a clamping screw 57.

The present invention provides a small, compact unit for taking microfilm pictures at various locations throughout the country. The easily removable bottom plate 21 permits the photographing of items too large to fit into the box unit, and also makes it possible to photograph bound volumes. The compact case shown in Fig. 1 opens into the rigid box structure of Fig. 5 which structure shields the subject from strong outside light and automatically puts the camera and lights into the proper position with respect to the material to be photographed without any adjustment by the operator. The entire unit may be constructed of readily available components that can be repaired or replaced quickly in almost any city, town, or village, if difficulties arise during a survey. The bulbs 33 and 33' may be conventional household light bulbs that can be purchased practically anywhere. Any conventional camera may be used as camera 23. In normal use film rolls having 36 exposures are used but increased capacity may be had by the use of 50 or 100-foot rolls.

The unit can be extensively used for obtaining census information but is also suitable for obtaining microfilm reproductions of unpublished maps and other materials, as well as copies of a variety of statistical material.

It will be apparent that the embodiment shown is only exemplary and that various modifications can be made in construction and arrangement within the scope of invention as defined in the appended claims.

What is claimed is:

1. A portable microfilming apparatus adapted to be closed to form a compact carrying case and to be erected into a self-contained photocopying mechanism comprising a first erectible unit and a second photocopying unit which cooperates with said first unit in both a closed and erected condition, said first unit comprising a rectangular compartment having an open front and top, a back and two side wall panels hingedly secured to said compartment and adapted to overlie each other and form a closure for said open top, said panels when erected forming extensions to said compartment, latch means on said back and side wall panels to rigidly interlock said panels when in erected position, said second photocopying unit comprising a rectangular frame adapted to fit within the rectangular compartment of said first unit, means for detachably retaining a camera and light source on said frame, said frame including one wall panel substantially contiguous with said open front portion of said first unit whereby when said photocopying unit is inserted in said compartment and the panels of the first unit are closed said wall panel on said second unit forms a closure for the front side of said first unit and support means on each of said panels which are cooperable with means on said rectangular frame for supporting said copying unit on said panels when erected.

2. A portable microfilm apparatus as described in claim 1 in which the support means on the back wall panel comprises a flange for supporting said photocopying unit when the panels are erected and for retaining said photocopying unit within the compartment when the panels are closed.

3. A portable microfilm unit as defined in claim 1 in which said rectangular compartment comprises a bottom panel and means for detachably securing said bottom panel to said compartment.

4. A portable microfilm unit as defined in claim 1 including fastening means on said photocopying unit and apertures on said end wall panels for receiving said fastening means for securing said photocopying unit to said end wall panels in a downwardly facing operative position.

References Cited in the file of this patent

UNITED STATES PATENTS

| | | |
|---|---|---|
| 1,282,117 | Ollom et al. | Oct. 22, 1918 |
| 2,251,335 | Hargreaves | Aug. 5, 1941 |
| 2,470,844 | Brownscombe | May 24, 1949 |
| 2,697,961 | Casselman et al. | Dec. 28, 1954 |
| 2,699,088 | Hedrick | Jan. 11, 1955 |
| 2,813,456 | Ostrov | Nov. 19, 1957 |